(12) United States Patent
Stern et al.

(10) Patent No.: US 9,384,440 B2
(45) Date of Patent: Jul. 5, 2016

(54) READER AND TRANSPONDER FOR OBSCURING THE APPLICATIONS SUPPORTED BY A READER AND/OR A TRANSPONDER AND METHOD THEREOF

(75) Inventors: Susanne Stern, Thal (AT); Paul Hubmer, Hart-Purgstall (AT); Peter Thueringer, Graz (AT); Bruce Murray, Hamburg (DE); Heike Neumann, Hamburg (DE); Hans De Jong, Eindhoven (NL)

(73) Assignee: NXP B.V., Eindhoven (NL)

( * ) Notice: Subject to any disclaimer, the term of this patent is extended or adjusted under 35 U.S.C. 154(b) by 809 days.

(21) Appl. No.: 12/994,569

(22) PCT Filed: Nov. 7, 2008

(86) PCT No.: PCT/IB2008/054665
§ 371 (c)(1),
(2), (4) Date: Nov. 24, 2010

(87) PCT Pub. No.: WO2009/144535
PCT Pub. Date: Dec. 3, 2009

(65) Prior Publication Data
US 2011/0068905 A1    Mar. 24, 2011

(30) Foreign Application Priority Data
May 26, 2008    (EP) .................................... 08104090

(51) Int. Cl.
*H04L 29/06*    (2006.01)
*G06K 19/077*    (2006.01)
*G06K 19/07*    (2006.01)

(52) U.S. Cl.
CPC ...... *G06K 19/07749* (2013.01); *G06K 19/0719* (2013.01)

(58) Field of Classification Search
CPC ....................................................... H04L 63/20
USPC ........................... 713/172; 340/10.1; 235/492
See application file for complete search history.

(56) References Cited

U.S. PATENT DOCUMENTS 5,701,316 A * 12/1997 Alferness et al. ............. 714/807
5,950,114 A *  9/1999 Balachandran et al. ....... 340/7.2
(Continued)

FOREIGN PATENT DOCUMENTS

JP    11-168461    6/1999
JP    2004-094370 A    3/2004
(Continued)

OTHER PUBLICATIONS

Lin, "Research on Encryption Model Based on AES and ECC in RFID", 2013, IEEE, p. 9-13.*
(Continued)

*Primary Examiner* — Taghi Arani
*Assistant Examiner* — Gregory Lane (57) ABSTRACT

Transponder (104), comprising a storage unit (106) having stored a number of different applications, a processing unit (108) which, on request of a reader (102), is adapted to generate a response interpretable using an encryption scheme known by both the transponder (104) and the reader (102) so that the reader (102) is capable of determining whether an application is supported by the transponder (104) by analyzing the response using the encryption scheme, and a transmission unit (110) adapted to send the response to said reader (102).

25 Claims, 4 Drawing Sheets

(56) References Cited

U.S. PATENT DOCUMENTS

| | | | |
|---|---|---|---|
| 6,126,078 A | 10/2000 | Locher et al. | |
| 6,185,307 B1* | 2/2001 | Johnson, Jr. | 380/270 |
| 6,323,566 B1* | 11/2001 | Meier | 307/10.2 |
| 6,330,614 B1* | 12/2001 | Aggarwal et al. | 709/236 |
| 6,792,541 B1 | 9/2004 | Kusakabe | |
| 7,272,723 B1* | 9/2007 | Abbott et al. | 713/185 |
| 7,801,867 B2* | 9/2010 | Mittal et al. | 707/686 |
| 8,046,823 B1* | 10/2011 | Begen et al. | 726/3 |
| 2002/0167918 A1* | 11/2002 | Brewer | 370/324 |
| 2003/0111528 A1 | 6/2003 | Sato et al. | |
| 2003/0188242 A1* | 10/2003 | Ishizuka et al. | 714/727 |
| 2004/0025035 A1 | 2/2004 | Jean-Claude et al. | |
| 2004/0049646 A1 | 3/2004 | Kusakabe et al. | |
| 2004/0066278 A1* | 4/2004 | Hughes et al. | 340/10.1 |
| 2004/0232247 A1 | 11/2004 | Tsunoda et al. | |
| 2005/0040244 A1* | 2/2005 | Kanan | 235/492 |
| 2005/0050367 A1 | 3/2005 | Burger et al. | |
| 2006/0077034 A1* | 4/2006 | Hillier | 340/5.61 |
| 2007/0040021 A1 | 2/2007 | Nakayma | |
| 2007/0145124 A1 | 6/2007 | Handa et al. | |
| 2007/0236350 A1* | 10/2007 | Nystrom et al. | 340/572.1 |
| 2008/0061941 A1* | 3/2008 | Fischer et al. | 340/10.1 |
| 2008/0170695 A1* | 7/2008 | Adler et al. | 380/277 |
| 2008/0278325 A1* | 11/2008 | Zimman et al. | 340/572.1 |
| 2009/0220072 A1* | 9/2009 | Schneider | 380/28 |
| 2009/0307482 A1* | 12/2009 | McCann | 713/153 |

FOREIGN PATENT DOCUMENTS

| | | |
|---|---|---|
| JP | 2004-220436 A | 8/2004 |
| JP | 2004-295176 A | 10/2004 |
| JP | 2004-317764 A | 11/2004 |
| JP | 2005-084846 A | 3/2005 |
| JP | 2005-228181 A | 8/2005 |
| WO | 2006/003562 A1 | 1/2006 |

OTHER PUBLICATIONS

International Search Report for Application PCT/IB2008/054665 (Apr. 16, 2009).

* cited by examiner

READER AND TRANSPONDER FOR OBSCURING THE APPLICATIONS SUPPORTED BY A READER AND/OR A TRANSPONDER AND METHOD THEREOF

FIELD OF THE INVENTION

The invention relates to a transponder having stored a number of different applications, to a reader designed to decrypt data received from a transponder, and to a method of obscuring the applications supported by a reader and/or a transponder. Beyond this, the invention relates to a program element. Furthermore, the invention relates to a computer-readable medium.

BACKGROUND OF THE INVENTION

Data transmitted between a reader and a transponder (in particular a smart card or an RFID tag) are encrypted so that an attacker can not gain the data and use it for criminal acts. For personal data, account data, credit card numbers and the like the use of this encryption is quite obvious. Because newer smart cards can emulate more smart cards, i.e. support a number of different applications, also the supported applications shall be obscured. The use of that is not obvious a priori. However, thinking about a card which supports applications from "Visa", "American Express", "Wal Mart", and "Subway New York" the use becomes clearer as it is very likely that this card belongs to an American citizen. With this "stigmata" he easily can get a target of a terrorist.

In the following, some further considerations regarding conventional communication systems will be described.

Privacy may be related to an individual and to a group of people sharing a certain property (e.g. US citizen). Protection of privacy may be desirable.

Privacy can leak in various ways. Conventionally, the UID (unique identifier) of the card used in collision detection is readable in plain. So, an individual user can be scanned at several places.

A conventionally available solution is to use a Random ID (RID). However, still the authentic applications in the readers need to know which card they communicate with, so there is still a need for a Unique Card Logical ID (UCLID).

When a card presents its type, brand, etc. this seems harmless. However, the knowledge that card type X of manufacturer Y is in use by the New York subway and has not been bought by many cities reveals that the bearer of such a card is with high likelihood a New Yorker.

It may be desirable that breaking one key used for one application shall not break the privacy for other applications.

WO 2006/003562 furthermore discloses a method of choosing one of a multitude of data sets being registered with a device, wherein each data set is associated with a specific key, wherein exchange information is encrypted in the device using one key of the keys, encrypted exchange information is sent to the remote device, decrypted there using the one key stored in the remote device, and decrypted exchange information is then sent back to device. Subsequently, the exchange information is compared with the decrypted exchange information. If the two are equal, the right data set is found, otherwise the cycle starts again with another key. Roles of device and remote device may change so that the cycle may be initiated in a remote device. WO 2006/003562 also relates to a device for presenting one of a multitude of data sets being registered with the device to a remote device.

However, said method uses trial authentications which are rather time consuming. Moreover it does not support multi-application readers.

OBJECT AND SUMMARY OF THE INVENTION

Hence, it is an object of the invention to provide a reader and/or a transponder being operable in a privacy preserving manner.

The object of the invention is achieved by a transponder, a reader, a method, a program element and a computer-readable medium according to the independent claims. According to an exemplary embodiment, a transponder is provided which comprises a storage unit having stored a number of different applications, a processing unit which, on request of a reader, is adapted to generate a response interpretable using an encryption scheme known by both the transponder and the reader so that the reader is capable of determining whether an application is supported by the transponder by analyzing the response using the encryption scheme, and a transmission unit adapted to send the response to said reader.

More specifically, according to an exemplary embodiment, a transponder is provided (which may be communicatively coupled with a reader) having stored a number of different applications (for instance one or a plurality of applications supported by the transponder), which on request of a reader (for instance by a communication message transmitted from the reader to the transponder) expands the name of an application by a random number (for instance a true random number or a pseudo random number which may be generated by a random number generator of the transponder or which may be stored in a storage unit of the transponder), encrypts or MACs (that is to say generates a Message Authentication Code, MAC) the expanded number with a key associated with said application (which key may also be known by the reader), and sends the encrypted number to said reader. According to another exemplary embodiment, a reader is provided which comprises a transmission unit adapted for sending a request to a transponder indicative of a number of applications supported by the reader, an analysis unit adapted to analyze a response received from the transponder with an encryption scheme known by both the transponder and the reader, and a determining unit adapted to determine whether an application is supported by the transponder by analyzing the response using the encryption scheme.

According to another exemplary embodiment, a reader is provided (which may be communicatively coupled with a transponder), designed to decrypt data received from a transponder with a key (which key may also be known by the transponder) associated with an application (for instance one or a plurality of applications supported by the transponder) and to determine whether said decrypted number contains a name of said application. According to still another exemplary embodiment, a method of obscuring applications supported by a reader and/or a transponder is provided, the method comprising:

the reader sending a request command to said transponder, the transponder generating a response interpretable using an encryption scheme known by both the transponder and the reader and being indicative of whether an application is supported by the transponder, the transponder sending the response to said reader, and the reader determining whether an application is supported by the transponder by analyzing the response using the encryption scheme.

More specifically, according to still another exemplary embodiment, a method of obscuring the applications supported by a reader and/or a transponder is disclosed, the method comprising:

the reader sending a request command to said transponder, the transponder expanding the name of an application, which it supports, by a random number, the transponder encrypting or MACing the expanded number with a key associated with said application, the transponder sending the encrypted or MACed expanded number to said reader, the reader decrypting said encrypted expanded number or verifying the MAC on the said encrypted expanded number, and the reader determining whether said decrypted or verified expanded number contains a name of an application.

According to still another exemplary embodiment of the invention, a program element (for instance a software routine, in source code or in executable code) is provided, which, when being executed by a processor, is adapted to control or carry out a data processing method having the above mentioned features.

According to yet another exemplary embodiment of the invention, a computer-readable medium (for instance a CD, a DVD, a USB stick, a floppy disk or a hard disk) is provided, in which a computer program is stored which, when being executed by a processor, is adapted to control or carry out a data processing method having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

The term "transponder" may particularly denote an RFID tag or a (for instance contactless) smartcard. More generally, a transponder may be a device (for instance comprising a chip) which may automatically transmit certain (for example coded) data when activated by a special signal from an interrogator.

The term "reader" may particularly denote a base station adapted for sending an electromagnetic radiation beam for reading out a transponder and detecting a back reflected or emitted signal. The reader device may be adapted as one of the group consisting of a read and/or write device, an RFID reader, a contactless chip card reader, a passive transponder, and a Near Field Communication device.

The term "application" may particularly denote a service within a communication system formed by the reader and the transponder to which service the transponder may provide a contribution. The provision of such a contribution may involve the capability of the transponder to provide stored or calculated data, to provide processing capabilities, etc. Examples for such services is the payment of a fare for using a public transportation by a user of the transponder, the payment of a purchase price for a good by a wireless payment system, a credit card service, etc.

The term "name of an application" may particularly denote an identifier or a code indicative of the application or allowing to unambiguously retrieve a specific application based on the identifier. Such a name may particularly be any alphanumerical code such as a sequence of letters, a sequence of numbers or a combination of letters and numbers.

The term "encryption scheme" may particularly denote any scheme, routine or algorithm applied for encoding a data block as a basis for a communication message in a manner that an interpretation of the content of the encrypted data block requires the knowledge of the encryption scheme, for instance one or more keys used for the encryption. Different kinds of encryption which fall under this term are a symmetric encryption (wherein communication partner entities may use the same key on both sides) and a public encryption (wherein communication partner entities may use a public key, a private key or the like). Particularly, also the formation of a MAC (Message Authentication Code) and the formation of a CRC (Cyclic Redundancy Check) which is afterwards encrypted can be considered as forms of an encryption based on an encryption scheme.

The term "Message Authentication Code" (MAC) may particularly denote a short piece of information used to authenticate a message. A MAC algorithm may accept as input a secret key and an arbitrary-length message to be authenticated, and may output a MAC. The MAC value may protect both a message's data integrity as well as its authenticity, by allowing verifiers (who also possess the secret key or the corresponding public key).

The term "Cyclic Redundancy Check" (CRC) may particularly denote a type of function (or an output thereof) that takes as input a data stream of any length, and produces as output a value of a certain space, for instance an integer of a certain number of bits. A CRC can be used as a checksum to detect alteration of data during transmission.

An embodiment of the invention may offer the advantage that the applications supported by a transponder may be obscured during transmission of communication messages between a reader and a transponder. Accordingly, an attacker cannot get any information which or how many applications are supported by a transponder, thereby protecting privacy of communication partners.

In an embodiment, also data coming from the reader may be obscured so that an attacker can also get no information which or how many applications are supported by the reader.

Some exemplary aspects of embodiments of the invention will be mentioned in the following:

The reader may communicate a set of applications that it supports and the transponder may respond to the reader whether it supports one or more of these applications and may optionally convey the transponder identity to the reader.

This communication may be done in a way which maintains confidentiality (so that an attacker cannot interpret whether or not the transponder supports the application) and integrity (so that the reader can determine that the transponder supports the application as well as that the reader can determine that the transponder supports the application at this moment, the latter may be denoted as freshness).

The reader can then select the application by sending a message to the transponder which the transponder can decode, but from which an attacker cannot draw conclusions on the support.

Confidentiality may denote that an attacker cannot determine what application the transponder supports. Neither by observing one communication in which for instance an application name would be transported. This is the reason to encrypt the communication. Nor by observing multiple message, which from their being identical disclose information, even though they are encrypted. This is the reason for including a random number.

Integrity may denote that the reader can from the response determine that this response was generated by a transponder supporting the application. This can be done particularly by one of the following exemplary embodiments, wherein many alternatives are possible:

A MAC calculated over RND||ApplName. This conveys the support of the application, but not the transponder's identity. Here, RND is a random number and ApplName is a identity of an application.

A CRC calculated over some information, for instance the RND∥UCLID and then the whole (RND∥UCLID∥CRC) encrypted. Here, UCLID is an identifier of the transponder. The CRC provides integrity.

A MAC calculated over some encrypted information, for example over Enc (K, RND∥UCLID). The MAC provides integrity. Here, Enc is an encryption function and K is a key.

Freshness can be handled in the following way: The reader can send a random number together with a list of applications that it supports. The transponder may include that random number on the basis of the calculation of the CRC or MAC. This may prevent replaying previous responses of the transponder.

Application selection can be done with confidentiality (hence encryption and inclusion of a random number), integrity (so that the transponder can determine that the message is genuine) and freshness (reason for including some random information that the transponder has provided to the reader in the earlier procedure).

In an embodiment, the application support may be communicated by the reader and the transponder responds in a way that the reader can determine the actual support while an attacker cannot determine that.

In the following, further exemplary embodiments of the transponder will be explained. However, these embodiments also apply to the reader, to the method, to the program element and to the computer-readable medium.

A processing unit (such as an integrated circuit of the transponder having processing capabilities) of the transponder may be adapted for evaluating, upon receipt of the request from a reader indicative of applications supported by the reader, which of the one or more applications supported by the reader is or are also supported by the transponder, and for performing the expanding and the encrypting for the applications supported by the reader and supported by the transponder. Thus, the transponder may react on the request of the reader by generating a list of applications which the transponder supports and which also the reader supports. Thus, an agreement between transponder and reader may be achieved regarding applications supported by both entities.

The processing unit may be adapted to expand the name of the application by the random number and a checksum before encrypting. Any one of the names of the applications, the random numbers, the checksum, and the keys may be any sequence of numeric characters, sequence of letters, or any alphanumeric code. Although specific embodiments may allow to simply add the name of the application to the random number, the system may become even more safe and less prone to failure when additionally to the name of the application and the random number also a checksum is added to the data block before it is encrypted for subsequent safe transmission.

In an embodiment, the processing unit of the transponder may be adapted to, for an application which is not supported by the transponder, generate a random number as well. A transmission unit (such as an antenna) of the transponder may be adapted to send the generated random number to said reader. By also adding a data block for an application which is not supported by the transponder to a transmission message such as a communication message, the length of the communication message may be made independent of the number of applications supported by the transponder. Thus, an attacker may not derive the number of (supported) applications by merely analyzing the length of the communication message.

The random number generated for an application which is not supported by the transponder may be free of any indication of a name of the application which is not supported. Alternatively, the random number generated for an application which is not supported by the transponder may be accompanied by an indication to a name of the application which is not supported and with an indication about the fact that this application is not supported.

The advantage, that a mere analysis of the length of a communication message sent from the transponder to the reader does not allow to determine a number of applications supported by the transponder, particularly holds when the processing unit is adapted to, for the application which is not supported by the transponder, generate the random number with a length being the same as a length of the encrypted number for an application which is supported by the transponder. By taking this measure, an attacker is not capable at all of distinguishing, based on the length of a transmitted data section, whether a specific application is supported or not supported by one of the communication entities. This may further increase the data safety and privacy when operating the communication system.

The random number may be a pseudo random number. In contrast to a pseudo random number, a truly random number is a number produced independently of its generating criteria. For cryptographic purposes, numbers based on physical measurements may be considered as random. Pseudo random numbers may be numbers with as little detectable pattern as possible but not truly random. Computer programs may make pseudo random numbers because they cannot make truly random numbers. The random number generator may be part of the transponder.

The processing unit of the transponder may be adapted to include an identifier indicative of an identity of the transponder in the response. In other words, the transponder may include for instance a unique identifier (UID) or Card Logical Unique Identifier (CLUID) in the communication message so as to clearly indicate to the reader which transponder has answered to the reply.

The processing unit may be adapted to select one of a number of applications supported by the reader and may include the selected application in response. In a scenario, in which the reader and the transponder both support a plurality of identical applications, the transponder may have the capability to select one of these possible applications for subsequent use. This may simply be indicated by the transponder by answering to the response with the name of the application which shall be used in the following for subsequent communication. Hence, the transponder may make a decision which application will be presented to the reader.

The processing unit may be adapted to include a plurality of or all applications supported by the transponder in the response as a basis for a subsequent selection by the reader of one of the supported applications. In such an embodiment, the reader may be the entity to decide which one of a plurality of applications supported by both communication partner devices can be used in the following. Hence, after the reader has received the response from the transponder including information which application(s) is (are) supported by the transponder, the reader may select a specific one of the supported applications which is preferred for instance in accordance with a specific decision criteria. This selected application may then be used subsequently for a further cooperation between reader and transponder.

The processing unit of the transponder may be adapted to generate the response to comprise a Message Authentication Code (MAC). This Message Authentication Code is example as to how an encryption scheme can be used between transponder and reader for obscuring names of applications supported by both of them. There are various possibilities of forming such a Message Authentication Code which fulfil this criteria. One possibility is to form the MAC based on a key associated with an application in combination with a random number. An alternative is the combination of a name of an application and a random number. A further alternative is a combination of a name of an application and a random number and an identifier indicative of an identity of the transponder. Such a MAC may allow the reader to unambiguously determine whether the application is supported by the tag.

As an alternative to the transmission of a message authentication code as the response, embodiments of the invention may use a Cyclic Redundancy Check (CRC) as the response or as a part thereof and then being encrypted afterwards. Such an encrypted CRC may be considered as one example as to how to apply an encryption scheme. Such a CRC may be based on a random number and an identifier indicative of an identity of the transponder. It is also possible to encrypt a combination of the CRC with a unique identifier and a random number.

The processing unit may be adapted to generate the response to comprise a checksum or any other data block being free of a name of an application but including information allowing the reader to determine whether an application is supported by the transponder based on an analysis of the checksum. For example, the reader does not have to include all supported applications in a single communication message. In an alternative embodiment, it is possible that the reader subsequently sends a plurality of communication messages to the transponder, each asking whether a specific application is supported. In reply to each of these communication messages, the transponder may indicate without specifically naming the application, whether the application included in a previous request is supported or not. This can be indicated with a MAC which allows the reader to unambiguously derive a correlation between an application and the information regarding support or non-support.

Next, further exemplary embodiments of the reader will be explained. However, these embodiments also apply to the transponder, to the method, to the program element and to the computer-readable medium.

The reader may comprise an evaluation unit (which may be part of a processor of the reader) which may be adapted for evaluating which transponder is or which transponders are presently within a radio range of the reader. In such an embodiment, the reader may first detect a number of transponders (such as RFID tags or smart cards) being located within a spatial range around the reader in which range the reader is capable of communicating with the transponders.

After having performed such an evaluation, a selection unit (which may be part of a processor of the reader) of the reader may select one of the transponders, which have previously been detected to be within the radio range, for further communication. Such a selection procedure may be performed in the context of an anticollision procedure in order to ensure that the reader communicates at each time only with one of the transponders to avoid crosstalk. For example, other transponders (others than the selected transponder) within a radio range of the reader may be switched to a mute or silent state by the reader.

The reader may further comprise a transmission unit adapted for sending a request to a transponder, the request being indicative of one or more applications supported by the reader. Such a transmission unit may be a communication antenna. With such a request, a reader may instruct a communicatively coupled transponder to indicate which applications are supported by the reader. With this information, the communication system may then continue the further communication in a more meaningful manner, for instance preventing communication regarding applications which can not be supported by the communication partner devices, that is the transponder and/or the reader.

In an alternative embodiment, such a request may also be sent in plaintext, for instance in a scenario in which it is not safety relevant which applications are offered by a reader or in a scenario in which it is not safety relevant that a reader asks a transponder for information regarding applications supported by the transponder.

The processing unit and/or the transmission unit of the reader may be adapted for sending the request with a constant length independent of a number of applications supported by the reader. Generally, including each application supported by the reader in the request may require a specific data length, so that a data block consisting of a simple list of supported applications would depend on the number of supported applications. Thus, if only this data block would be sent to the transponder, it would be possible for a possible attacker to derive the number of supported applications by simply analyzing the length of the communication message. However, if the request is always sent with a constant length and possibly empty data sections are filled with for instance a random number, it may be obscured which number of applications are supported by the reader.

The processing unit and/or the transmission unit of the reader may be adapted for sending an "empty" request to a transponder for requesting the transponder to indicate applications supported by the transponder. In this context, the term "empty" may denote a message which does not include an indication which applications are supported by the reader and/or an indication that a list of applications supported by the transponder is requested by the reader. In such an embodiment, the request may be completely free of any indication regarding supported applications but may include an indication which allows the transponder to identify that the information requested by the reader is the number of applications supported by the transponder.

A determining unit of the reader may be adapted to reason that an application is not supported by the transponder when determining that said decrypted expanded number does not contain a name of said application. In other words, the absence of a known application in the communication message transmitted from the transponder to the reader may allow the reader to reason that in the specific embodiment a corresponding application is not offered by the transponder.

The determining unit of the reader may be adapted to determine an identity of the transponder by retrieving an identifier indicative of the identity of the transponder from the response. Thus, in accordance with an agreed data ordering scheme, the reader may also get the information from the reply which transponder has answered to the request. This allows to operate the system also in an environment of one reader and multiple transponders.

The determining unit of the reader may be adapted to determine one application supported and selected by the reader for subsequent use from the response. Such an embodiment corresponds to a scenario in which the transponder decides about an application to be used.

Alternatively, the reader may make the decision about an application to be used in the following for a subsequent communication between reader and transponder. In such a scenario, the determining unit of the reader may be adapted to select one of a plurality of applications supported by the transponder for subsequent use and to communicate the selected application to the transponder. For instance, a reader may ask for an answer which ones of ten applications are supported by a transponder. The transponder may answer with six of these ten applications which it supports. The reader can then select one of these six commonly supported applications for a further operation of the reader transponder system and may inform the transponder accordingly.

To allow a reader to operate in accordance with a transponder described above and generating a CRC and or a MAC in or as the response, corresponding provisions may be taken in the reader to interpret such a CRC and/or a MAC.

It is also possible that the determining unit of the reader is adapted to determine an application supported by the transponder by analyzing a MAC or another data block included in the response, the MAC being free of a name of an application. In a scenario, in which a reader asks for support of a specific application per communication message and therefore sends a plurality of requests one after the other to the transponder, each reply to each request may allow, by an analysis of the MAC, to determine whether—for a specific queried application—the transponder indicates support or not.

Exemplary embodiments of the invention may allow to provide privacy attributes regarding a selected application identity. The architecture according to an exemplary embodiment of the invention may accommodate multi-application readers. Such an architecture may further be free of using trial authentications. Instead of these, embodiments may have a single capability response from a transponder which itself may be dependent on an inquiry by a reader (that is the transponder only responds with respect to applications supported by the reader). Thus, a sophisticated privacy attribute and a fast performance may be guaranteed by exemplary embodiments of the invention.

These and other aspects of the invention are apparent from and will be elucidated with reference to the embodiments described hereinafter.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

The illustration in the drawing is schematically. In different drawings, similar or identical elements are provided with the same reference signs.

Figure 1:
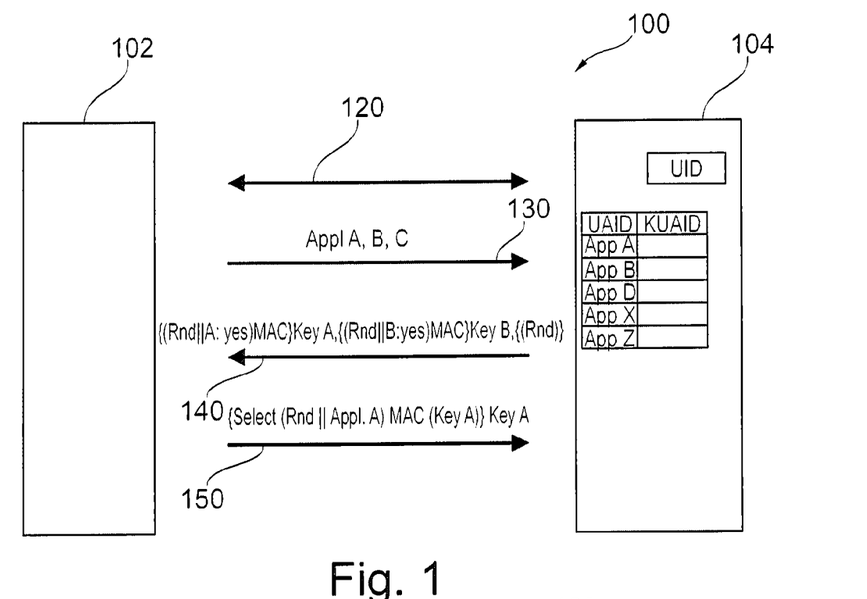
FIG. 1 shows a message flow between a reader and a smart card according to an exemplary embodiment of the invention.

FIG. 1 shows a message flow between a reader 102 and a smart card 104 forming a communication system 100 according to an exemplary embodiment of the invention During a communication between the reader 102 and the smart card 104, a number of communication messages are exchanged, as will be explained in the following in further detail.

In a step 1 (see reference numeral 120) of the communication scheme of FIG. 1 the reader 102 evaluates which smart cards are in its radio range and finally selects one of them during an anti-collision procedure, which procedure is known per se. The selected one is the transponder 104.

In a step 2 (see reference numeral 130), the reader 102 sends a command to the smart card 104, which command contains information about the applications supported by the reader 102. In the present example the reader 102 supports the applications A, B, and C.

In a step 3, the smart card 104 evaluates which of the applications supported by the reader 102 are also supported by the card 104. Subsequently, the card 104 sends the name of a supported application expanded by a random number and a checksum back to the reader (see reference numeral 140), wherein the expanded number is encrypted and/or MACed with an key associated with the application before. In the present example the card 104 supports the applications A, B, D, X, and Z. Application C is not supported by the smart card 104. Hence, the name of the application A is expanded by a random number and a checksum and then encrypted and/or MACed with a key which is associated with the application A. In the same way the name of application B is processed. Because application C is not supported, only a random number is generated and transmitted to the reader 102. One should note that the random number has the same length as the resulting numbers for applications A and B.

In a step 4, the reader 102 decrypts the received data and/or checks the MAC with the keys for applications A, B, and C which were also used by the smart card 102 (strictly speaking the card 104 used keys for A and B only). After the decryption, the application names for A and B appear in plaintext, or the MAC where application names A or B were used matches the received MAC. So the reader 102 knows that the smart card 104 supports the applications A and B and does not support application C (as for C a random number appears after decryption). Subsequently, the reader 102 chooses one of the applications and tells the smart card 104 which of the applications shall be used for the further procedure.

In the present example, the name of the application A is expanded by a random number and a checksum. Then, the resulting number is encrypted with a key associated with application A and transmitted to the smart card 104 (see reference numeral 150). In the smart card 104, the received data is decrypted again so that the name of the application A appears in plaintext. Both the reader 102 and the smart card 104 now know which application shall be used. Alternatively the smart card 104 computes a MAC and verifies that it is identical to the received MAC.

The described procedure may involve the following advantages:

The application name which the transponder supports is never transmitted in plaintext so that it may be prevented that an attacker obtains unauthorized information regarding applications provided in the communication system.

The encrypted name is never the same as it contains a random part, so that an attack is made even more difficult.

The length of the answer of the card is always the same, regardless of the number of applications supported by the communication partners. This obscures also the number of supported applications.

Accordingly, an attacker can neither determine which nor how many applications are supported by the smart card.

In an alternative embodiment, in step 2 of FIG. 1, the application names are transmitted in plaintext because the primary target which shall be secured is the smart card 104. Nevertheless, also the communication from the reader 102 to the smart card 104 can be encrypted. In an further embodiment there is no information about the applications supported by the reader 102 at all so that just an empty command is sent to the card 104 in step 2.

However, because of the length of the answer, the number of supported applications can be determined by an attacker. Hence, in a further embodiment, the command of step 2 has a predefined default length for, for instance, 10 applications. Data blocks which are not used for applications are then filled with random numbers. An attacker then neither can determine which nor how many applications are supported. The attacker can not determine which or how many applications are supported by the smart card 104.

Privacy plays an important role for individuals and also for a group of people sharing a certain property. However, privacy can leak in various ways. With conventional card communication systems, collision detection may be readable in plain. Thus, an individual user can be scanned at several places. Even when using random identifiers, still the authentic applications in the readers need to know which card they communicate with, so still there is a need for a Card Logical Unique ID (CLUID). When a card presents the application it supports this may be not harmless. An attacker may be able to follow individuals based on side channel information derivable from supported applications.

Also when a card presents its type, brand, etc. this is not always harmless. For instance, the knowledge that card type X of manufacturer Y is in use by the New York subway and has not been bought by many cities reveals that the bearer of such a card is with high likelihood a New Yorker.

In view of these configurations, privacy is an ultimate objective. It may be desirable that a communication system reveals no information about the card owner, card applications, card identifiers, card manufacturers, card type, etc., to any entity which is not an authentic reader for an application that is supported by that specific card instance. Thus, privacy should be lost neither through protocol, data, behaviour and neither through analog behaviour properties of the card.

The extent to which a communication system implements such an ultimate objective depends on available costs, time, compatibility with installed base, etc. Breaking one key used for one application does not break the privacy of other applications.

However, there may be a residual privacy risk in an ultimate privacy situation. If an application key breaks, the privacy of all users of that application is compromised. The UCLID can be read out and the user can be tracked in that way.

In the following, referring to FIG. 2, a communication system 100 according to an exemplary embodiment of the invention will be explained which may be capable of maintaining privacy.

The communication system 100 may be similar to that shown in FIG. 1 and comprises the reader 102 and the transponder 104 which are coupled to one another for wireless communication.

The reader 102 comprises a processor 112 (such a microprocessor or a central processing unit) which is coupled with an emitter antenna 114 and a receiver antenna 116. The emitter antenna 114 is capable of transmitting a communication message 118 to the transponder 104. The receiver antenna 116 is capable of receiving a communication message 122 from the transponder 104. Although the transmitter antenna 114 and the receiver antenna 116 are illustrated as two different antennas in FIG. 2, alternative embodiments may also use a single common shared transceiver antenna. The communication messages 118, 122 can be exchanged in a wireless manner between the entities 102, 104.

The antennas 114, 116 are electrically coupled with the processor 112 so that data may be transmitted from the processor 112 to the transmission antenna 114 for transmission as a communication message 118, and a communication message 122 received by the receiver antenna 116 may also be analyzed and processed by the processor 112.

A storage unit 124 such as a semiconductor memory is coupled with the processor 112 for bidirectional data transfer so as to store data accessible by the processor 112. Furthermore, an input/output unit 126 is shown which allows a user to operate and control the reader device 102.

Figure 2:
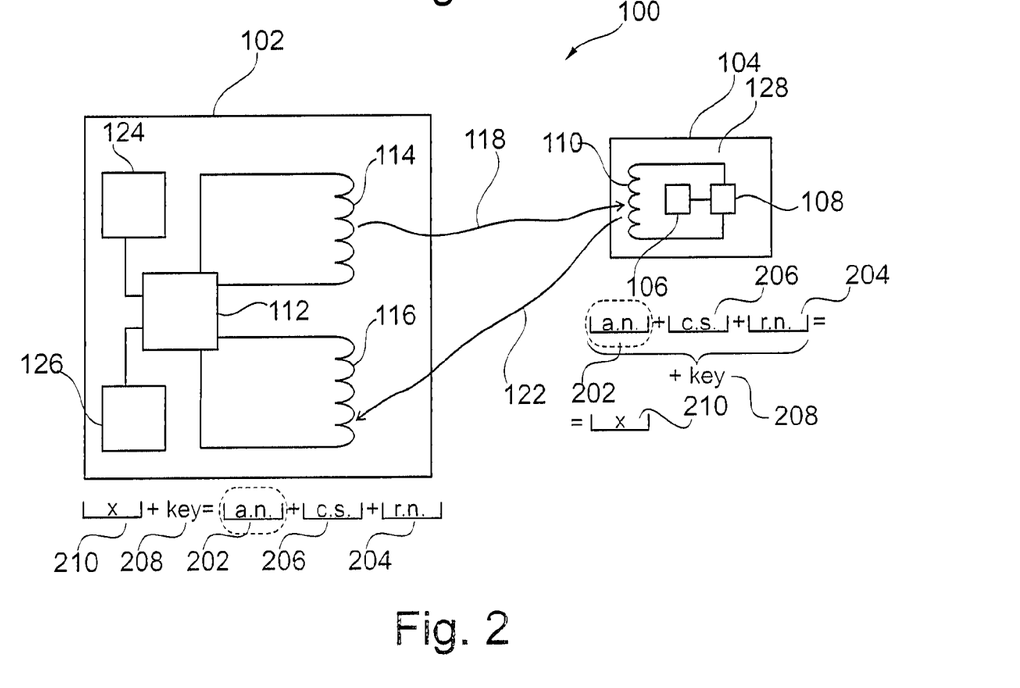
FIG. 2 shows a communication system according to an exemplary embodiment of the invention.

As can further be taken from FIG. 2, the transponder 104 comprises a transmission and receiver antenna 110, a processor 108 such as a microprocessor and a memory 106. In an embodiment, the memory 106 and the processor 108 may be monolithically integrated in an integrated circuit (IC) which can be connected to the antenna 110 and attached to a support 128 such as a piece of fabric.

During operation, the processor 112 of the reader 102 may serve as an evaluation unit for evaluating which transponders 104 are within the radio range of the reader 102. In the present scenario, only the transponder 104 is in the radio range of the reader 102, that is sufficiently close to allow for a sufficiently accurate communication. During an anti-collision procedure in the case of multiple transponders being within the radio range of the reader 102, the processor 112 may serve as a selection unit for selecting one of the transponders, in the present scenario the transponder 104, within the radio range for subsequent communication.

The reader 102 may further send, via the emission antenna 114, a request such as the communication message 118 to the transponder 104 indicative of applications supported by the reader 102. Such a request may be sent in an encrypted manner or in plaintext. In another embodiment, the request 118 may be free of any indication of applications supported by the reader 102.

However, in a preferred embodiment, the transmission antenna 114 sends the request 118 with a constant length independent of a number of applications supported by the reader 102 but nevertheless indicating the supported applications in an encrypted manner. This prevents that an attacker may identify information provided by the reader 102 by analyzing the length of the communication message 118. Empty portions of a corresponding data packet may be filled with random numbers for obscuring the number of supported applications to an attacker.

The transponder 104 may store in its storage unit 106 data necessary for supporting a number of different applications which are supported by the transponder 104. On receipt of the request 118 from the reader 102, the processing unit 108 may generate a communication message 122 to inform the reader 102 regarding the applications supported by the transponder 104. For that purpose, it is possible that a name of an application denoted in FIG. 2 schematically with reference numeral 202 can be expanded by a random number 204 and a checksum 206. The random number may be generated by the processor 108. The checksum 206 as well as the application name 202 may be stored in the memory 106. Furthermore, the data packet 202, 206, 204 may be encrypted using a key 208 which is also storable in the memory 106. This key 208 may be associated with or assigned to the application indicated with the name 202. A correspondingly encrypted data message 210 may then be sent by the transmission antenna 110 to the reader device 102, as indicated with the communication message 122 in FIG. 2.

If an application is not supported by the transponder 104, the transponder 104 may simply send a communication message to the reader 102 consisting of a random number. This may have the same length as the communication message 210 so as to make it difficult for an attacker to derive information regarding the number of applications supported by the transponder 104.

Upon receipt of the communication message 122 by the receiver antenna 116, the processor 112 will operate as a decryption unit for decrypting data received using the key 208 associated with the application supported by the transponder 104. By taking this measure, the decrypted number, that is the data packet 202, 206, 204 can be derived by the processor 112. From this data packet 202, 206, 204, it is possible for the processor 112 to identify the application name 202 which allows the reader device 102 to determine that the transponder 104 supports the corresponding application. For the further communication between the reader device 102 and the transponder 104, both entities know that the application indicated by the application name 202 can be provided by both entities. At the same time, privacy is maintained.

One skilled in the art should note, that the inventive transponder, the inventive reader and the inventive method, as well as the inventive software is not limited to contactless data transmission, but in principle also applies to wired communication.

In the following, referring to FIG. 3, a communication scheme 300 between a reader 102 and a transponder 104 according to an exemplary embodiment of the invention will be explained.

In the described embodiment, a communication message 302 is sent from the reader 102 to the transponder 104 including a number of application names 202 (A, B, C) for which the reader 102 wishes to know whether these applications are supported by the transponder 104.

As a response to this request 302, the transponder 104 generates a communication message 304 which includes, inter alia, a calculated MAC 306 which is formed on the basis of a name of an application 202 (namely the supported application A) combined with a random number 204 for obscuring the name of the supported application A. In this context it should be noted that a field 310 provides integrity of the cryptogram.

Both the communication message 302 and the response 304 may include a further random number 308 denoted as RndQ which is optional and may serve for determining freshness.

The communication message 304 not only includes the blocks 204, 202, 308 relating to application A, but may also comprise corresponding blocks indicating support for applications B and C, if applicable. As indicated by reference numerals 204' and 204", also for applications B and C a corresponding random number may be calculated. As indicated by reference numerals 310' and 310", also for applications B and C an integrity block can be calculated. The integrity blocks 310' and 310" are calculated in the same way as the data block 310 for application A: MAC over status, RndF or RndH, application name and RndQ, and using a key KB or KC instead of a key KA.

After transmission of the reply 304 from the transponder 104 to the reader 102, an analysis of the message 304 on the reader 102 side allows the reader 102 to extract the information which application(s) is (are) supported by the transponder 104.

Since in the present embodiment, three applications A, B, C are supported by the transponder 104, the reader 102 may perform a select procedure indicated with reference numeral 320. For this purpose, the reader 102 calculates a MAC 322 using key KA, KB or KC dependent on whether application A, application B or application C is chosen. The MAC 322 comprises the random number 308, a block 324 indicative of application A, application B or application C as well as a corresponding random number RndD 204, RndF 204' or RndH 204".

Upon receipt of the communication message 320, the transponder may send back a message 330.

In case that the transponder 104 makes a selection regarding the supported application A, B, C to be used for a following operation, it is possible that the transponder 104 only gives one response back for application A, B or C. Then, the select command 320 is not needed since the transponder 104 has already made the selection.

Figure 3:
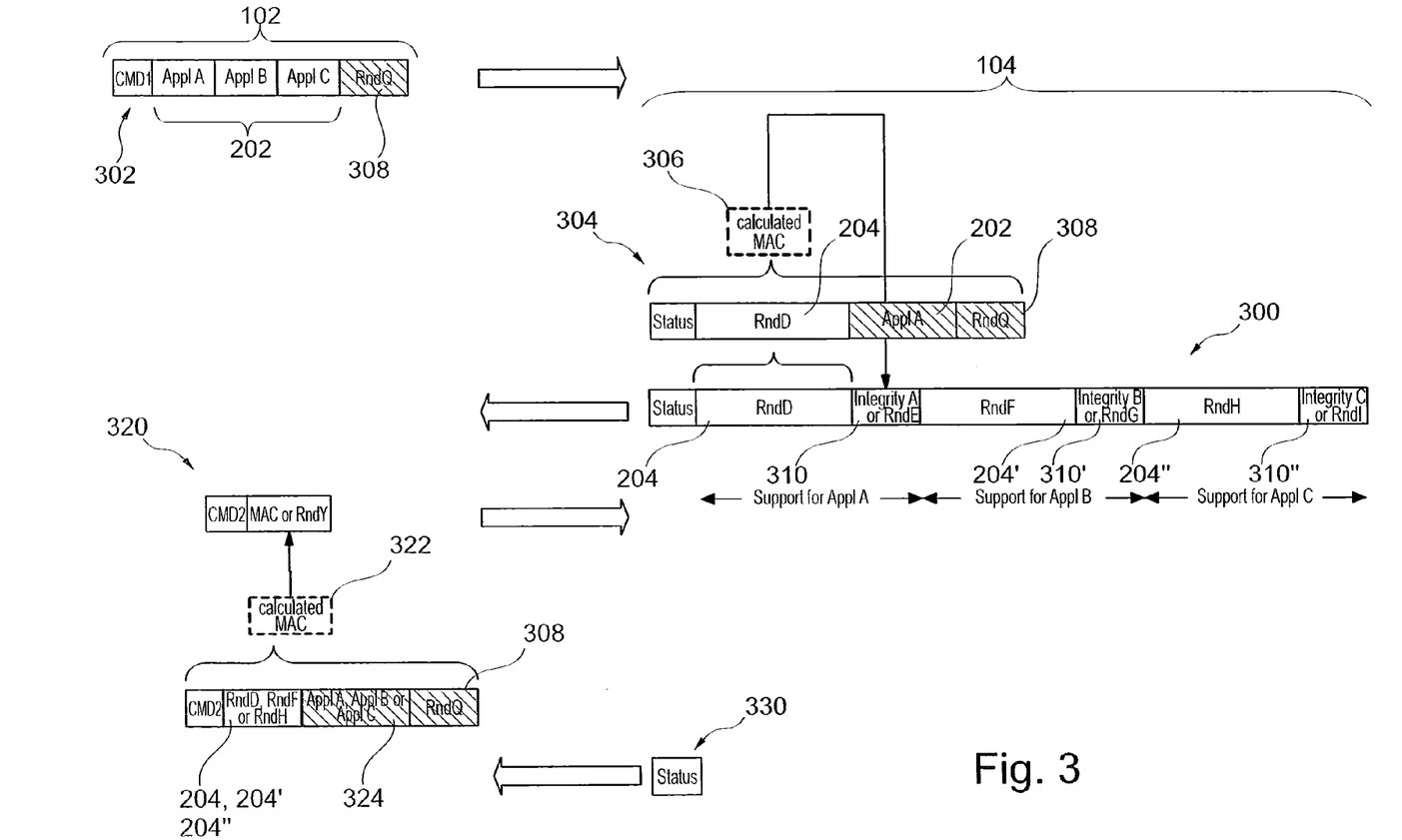
FIG. 3 to FIG. 5 shows message flows between a reader and a transponder according to exemplary embodiments of the invention.

The embodiment of FIG. 3 does not include an identifier (CLUID) of the transponder 104 in the MAC 306.

Figure 4:
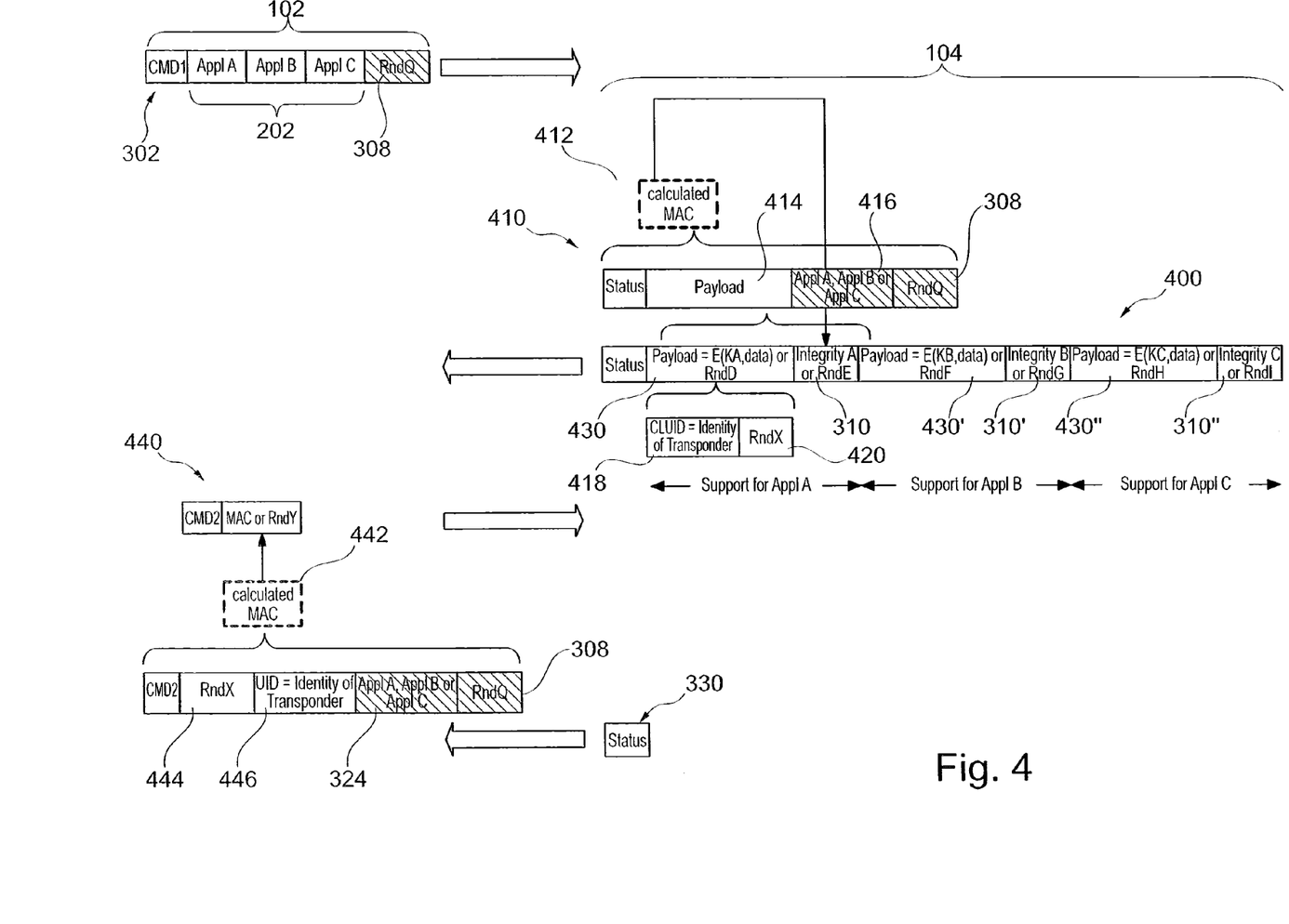

In the embodiment of FIG. 4 showing a communication sequence 400, a MAC 412 is generated which includes such a unique identifier.

In the embodiment of FIG. 4, after having received the request 302, the transponder 104 generates a reply 410. This reply 410 includes a calculated MAC 412 which is formed of a payload block 414 and a block 416 indicative of a name of an application. The payload block 414 is calculated as a function of a key KA related to the application A, as well as may include further data. Also the random number RndD can be used for that purpose. The payload block 414 includes a sub block 418 indicative of an identity of the transponder 104 and includes a random number block 420. Corresponding blocks may be generated as well for the applications B and C, if applicable, as indicated in FIG. 4.

The scenario of FIG. 4 of forming the reply 410 relates to a situation in which applications A, B and C are in fact supported by the transponder 104. In an alternative scenario in which an application is not supported, the transponder 104 may, instead of the communication message 410, simply send a random number to the reader 102. This obscures the "presence" or "absence" of any support.

The payload block 430 relates to application A, whereas a payload block 430' relates to application B and a payload block 430" relates to an application C. In a similar way, integrity blocks 310' and 310" are formed for applications B and C, corresponding to block 310. The payload blocks 430', 430" are calculated in the same way as the payload field 430 for application A, by encryption of the unique identifier CLUID and the random number RndX, but using the key KB or KC instead of KA.

Again, a selection message 440 may be generated by the reader 102 in a scenario in which the reader 102 selects one of the supported applications A, B, C for subsequent use. For this purpose, a MAC 442 may be calculated by the reader device 102 which includes a random number 444, a block indicative of an identity of the transponder 446, as well as comprising fields 324 and 308.

The example of FIG. 4 relates to a scenario in which reader 102 supports applications A, B and C. Regarding the MAC 442, random number RndY may be sent if the reader 102 selects neither application A, B or C. A key used for calculating the MAC 442 is KA, KB or KC, dependent on which application A, B, C is chosen.

As in FIG. 3, RndQ 308 may be used or not. Either a response is given for each of the applications, or the transponder 104 only gives one response back for A, B or C. Then the select command 440 is not needed.

Figure 5:
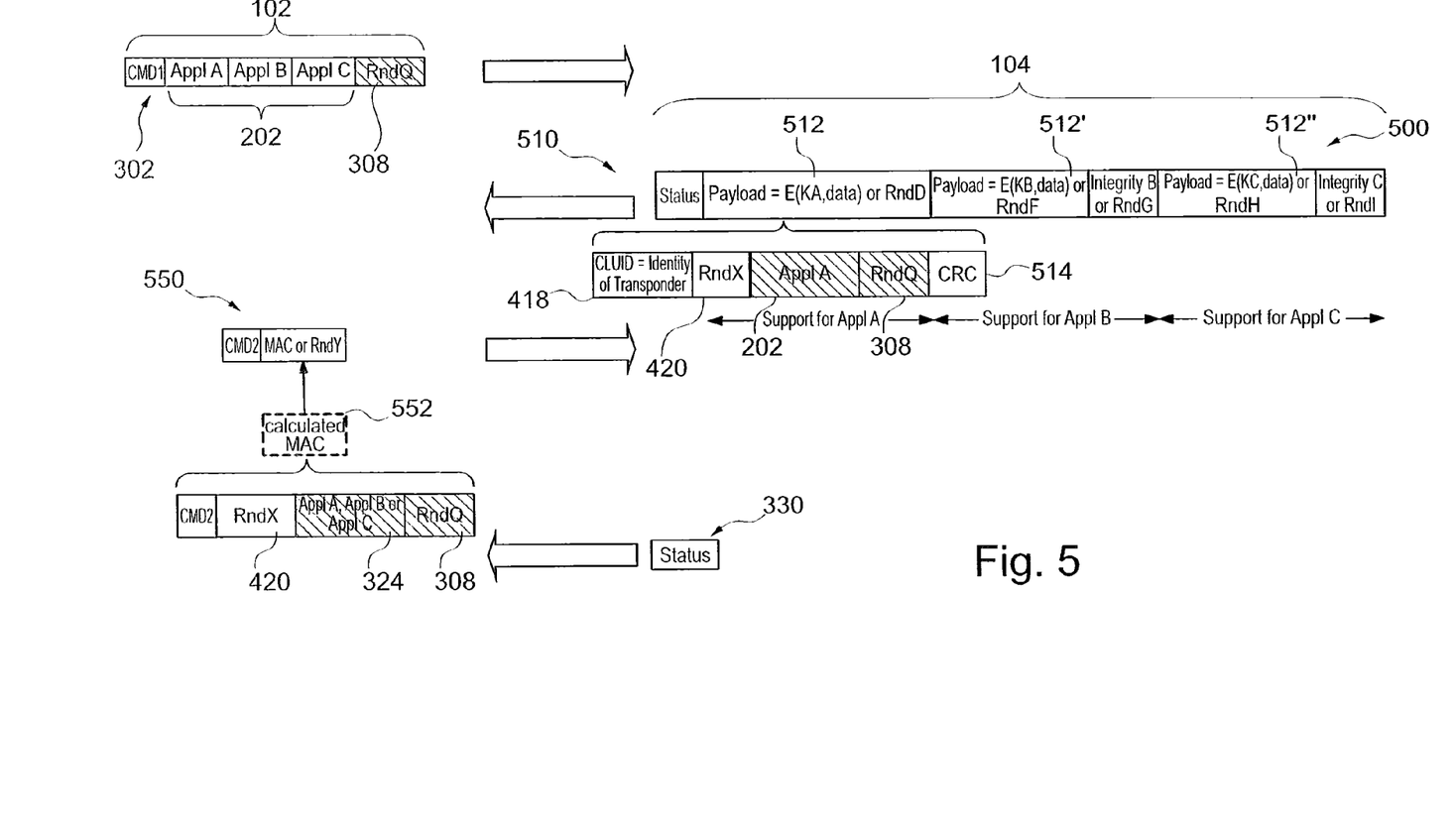

In the embodiment of FIG. 5, communication messages 302 and 330 are as in FIG. 3 and FIG. 4.

However, for calculating a communication message 510, a payload block 512 may be calculated as an encryption (E) of a key (KA) indicative of application A and of further data. Also a random number RndD can be used for calculating this block 512. As can be taken from FIG. 5 as well, the block 512 includes an identity of a transponder 418, a random number RndX 420, a name of an application A 202, an optional random number RndQ 308 and a Cyclic Redundancy Check (CRC) 514. The CRC 514 ensures integrity of the cryptogram. Corresponding blocks for applications B and C can be calculated accordingly, see reference numerals 512' and 512". For instance, the field 512' is calculated in a corresponding way as for application A: Encrypt CLUID, RndX, RndQ and CRC but using key KB instead of KA.

For a select message 550, a MAC 552 may be calculated. RndY may be sent if the reader 102 selects neither application A, B or C. For calculating the MAC 552, the key that is used is KA, KB or KC dependent on which application A, B or C is chosen.

According to an exemplary embodiment of the invention, the entire functionality of the reader and the transponder may be reversed, so the protocol flow is in the other direction. This is an equivalent solution to the explicitly disclosed systems and is also covered by the scope of the claims. For instance, reader application names may be protected by reverting reader and transponder side.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A transponder, comprising:
a storage device configured to store a number of different applications; and
a processor configured to generate, on request of a reader, a response interpretable using an encryption scheme known by both the transponder and the reader so that the reader is capable of determining whether an application is supported by the transponder by analyzing the response using the encryption scheme and decrypting names of applications supported by the transponder, wherein both the request and the response have a constant length that is independent of the number of different applications; and
a transmitter configured to send the response to said reader.

2. The transponder according to claim 1, wherein the processor is configured to evaluate, upon receipt of the request from the reader indicative of applications supported by the reader, which of the applications supported by the reader are also supported by the transponder, and perform the expanding and the encrypting for the applications supported by the reader and supported by the transponder.

3. The transponder according to claim 1, wherein the processor is configured to expand a name of the application by a random number and a checksum before encrypting.

4. The transponder according to claim 1, wherein the processor is configured to, for an application which is not supported by the transponder, generate a random number and the transmitter is configured to send the generated random number to said reader.

5. The transponder according to claim 4, wherein the processor is configured to, for the application which is not supported by the transponder, generate the random number with a length identical to a length of an encrypted number for the application which is supported by the transponder.

6. The transponder according to claim 1, wherein the processor is configured to include an identifier indicative of an identity of the transponder in the response.

7. The transponder according to claim 1, wherein the processor is configured to select one of a number of applications supported by the reader and to include the selected application in the response.

8. The transponder according to claim 1, wherein the processor is configured to include applications supported by the transponder in the response as a basis for a subsequent selection by the reader of one of the supported applications.

9. The transponder according to claim 1, wherein the processor is configured to generate the response to comprise a Message Authentication Code (MAC).

10. The transponder according to claim 9, wherein the processor is configured to generate the response comprising the MAC based on a name of an application and a random number.

11. The transponder according to claim 1, wherein the processor is configured to generate the response to comprise a Cyclic Redundancy Check (CRC).

12. The transponder according to claim 11, wherein the processor is configured to generate the response comprising the CRC based on a random number and an identifier indicative of an identity of the transponder.

13. The transponder according to claim 1, wherein the processor is configured to generate the response to comprise an encrypted checksum but being free of a name of an application so that the reader is enabled to determine whether the application is supported by the transponder based on the encrypted checksum.

14. A reader, comprising
a transmitter configured to send a request to a transponder, the request being indicative of a number of applications supported by the reader;
an analysis device configured to analyze a response received from the transponder with an encryption scheme known by both the transponder and the reader; and
a determining device configured to determine whether an application is supported by the transponder by analyzing the response using the encryption scheme, wherein the analysis device is a decryption device configured to decrypt the response received from the transponder with a key associated with an application to thereby derive a decrypted expanded number, and the determining device is configured to determine whether said decrypted expanded number contains a name of said application supported by the transponder, wherein both the request and the response have a constant length that is independent of a number of supported applications.

15. The reader according to claim 14, wherein the transmitter is configured to send the request in an encrypted manner.

16. The reader according to claim 14, wherein the determining device is configured to reason that the application is not supported by the transponder when determining that said decrypted number does not contain the name of said application.

17. The reader according to claim 14, wherein the determining device is configured to determine an identity of the transponder by retrieving an identifier indicative of the identity of the transponder from the response.

18. The reader according to claim 14, wherein the determining device is configured to determine, from the response, one application supported and selected by the reader for subsequent use.

19. The reader according to claim 14, wherein the determining device is configured to select one of a plurality of applications supported by the transponder for subsequent use and to communicate the selected application to the transponder.

20. The reader according to claim 14, wherein the determining device is configured to determine the application supported by the transponder by analyzing a Message Authentication Code (MAC) included in the response.

21. The reader according to claim 14, wherein the determining device is configured to determine the application supported by the transponder by analyzing a Cyclic Redundancy Check (CRC) included in the response.

22. The reader according to claim 14, wherein the determining device is configured to determine the application is supported by the transponder by analyzing a checksum included in the response, the checksum including information allowing the reader to determine whether the application is supported by the transponder based upon an analysis of the checksum.

23. A method of obscuring applications supported by a reader and a transponder, the method comprising:
   the reader sending a request command to said transponder;
   the transponder generating a response interpretable using an encryption scheme known by both the transponder and the reader and being indicative of whether an application is supported by the transponder, wherein both the request and the response have a constant length that is independent of a number of supported applications;
   the transponder sending the response to said reader;
   the reader determining whether the application is supported by the transponder by analyzing the response using the encryption scheme and decrypting names of applications supported by the transponder;
   the transponder expanding a name of an application, which the transponder supports, by a random number; and
   the transponder encrypting the expanded name with a key associated with said application for generating the response.

24. A non-transitory computer-readable medium, in which a computer program of obscuring applications supported by the reader and the transponder is stored, wherein the computer program, when being executed by a processor, is configured to carry out or control the method according to claim 23.

25. A program element of obscuring applications supported by the reader and the transponder, wherein the program element, when being executed by a processor, is configured to carry out or control the method according to claim 23.

* * * * *